Figure 1:
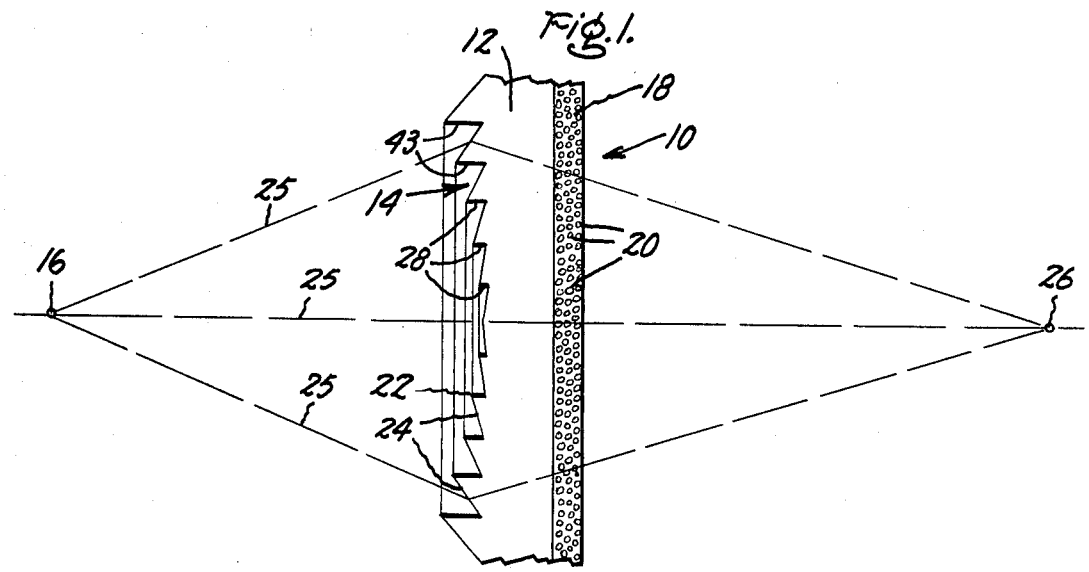

United States Patent [19]
Henkes, Jr.

[11] 3,712,707
[45] Jan. 23, 1973

[54] COMPOSITE BACK PROJECTION SCREEN AND METHOD OF FORMING

[75] Inventor: John L. Henkes, Jr., Loudonville, N.Y.

[73] Assignee: General Electric Company

[22] Filed: Feb. 27, 1970

[21] Appl. No.: 15,127

[52] U.S. Cl. ............... 350/122, 350/126, 350/127
[51] Int. Cl. ............... G03b 21/60, G03b 21/62
[58] Field of Search ........... 350/117, 122, 127, 126; 161/3.5; 118/415, 419

[56] References Cited

UNITED STATES PATENTS

| 911,613 | 2/1909 | Roberts | 118/419 |
|---|---|---|---|
| 2,180,113 | 11/1939 | Land | 350/126 |
| 2,726,573 | 12/1955 | Maloff | 350/126 |

FOREIGN PATENTS OR APPLICATIONS

| 130,137 | 11/1948 | Australia | 350/127 |
| 180,418 | 12/1954 | Austria | 350/127 |

Primary Examiner—Louis J. Capozi
Assistant Examiner—Denis E. Corr
Attorney—Richard R. Brainard, Paul A. Frank and John J. Kissane

[57] ABSTRACT

A composite back projection screen exhibiting a highly uniform intensity distribution and reduced scintillation is formed by embossing a Fresnel lens along either the front or back face of a thermoplastic sheet to focus projected light upon a predetermined viewing location and coating the front face of the sheet with a layer of bulk diffusing material to effect a multiple scattering of light passing through the layer. Desirably, either the risers of the Fresnel lens and/or the layer of bulk diffusing material is blackened to enhance the ambient rejection of the projection screen.

8 Claims, 8 Drawing Figures

PATENTED JAN 23 1973 3,712,707

SHEET 1 OF 4

Inventor:
John L. Henkes Jr.,
by John J. Kissane
His Attorney.

Inventor:
John L. Henkes Jr.,
by John J. Kissane
His Attorney.

Inventor:
John L. Henkes Jr,
by
His Attorney.

COMPOSITE BACK PROJECTION SCREEN AND METHOD OF FORMING

This invention relates to a back projection screen having enhanced uniformity of illumination and to a method of forming such screen. In a more particular aspect, the invention relates to a unitary projection screen having both a Fresnel lens for focusing light passing therethrough to a predetermined location and a coating of a bulk diffusing material along the front face of the screen for multiply scattering light rays therein.

Back projection screens desirably are characterized by high gain, a uniform intensity distribution across the entire surface of the screen when viewed over a wide viewing angle, high ambient light rejection and a relative freedom from scintillation, e.g., apparent shimmering colored spots of light annoying to the viewer. Because of the ability of a Fresnel lens to refract light towards a viewer, it heretofore has been proposed that an even illumination distribution could be provided over the entire surface of a back projection screen by incorporating a Fresnel lens into the screen. Similarly, back projections screens have been suggested utilizing a Fresnel lens in association with single surface diffusing elements such as a ground glass screen or diffusing lenses in optical registration with the prismatic elements forming the Fresnel lens. Although screens having a Fresnel lens in combination with a single surface diffusing element exhibit good back projection screen characteristics, there still is need for back projection screens having increased brightness, reduced scintillation, good ambient light rejection, and a more uniform intensity distribution over wider viewing angles.

It is therefore an object to provide a novel back projection screen exhibiting superior uniformity of illumination over a wide viewing angle and excellent ambient light rejection.

It is also an object of this invention to provide a novel back projection screen exhibiting reduced scintillation.

It is a still further object of this invention to provide a novel method of forming back projection screens having superior viewing characteristics.

These and other objects of this invention generally are achieved in a back projection screen having a Fresnel lens embossed along one face of a transparent plastic sheet for focusing projected light rays passing therethrough and an approximately 1–5 mil thick layer of a bulk diffusing material coated atop the front face of the screen to produce a multiple scattering of projected light rays therein. The multiple scattering of the light rays passing through the screen results in a more uniform distribution of light intensity over a wider viewing angle and a reduction in the observable scintillation of the screen. For superior ambient light rejection, the risers of the Fresnel lens and/or the layer of bulk diffusing material are blackened.

Because uniformity of the layer of bulk diffusing material atop a thermoplastic sheet requires a controlled withdrawal of the thermoplastic sheet from a bath containing the diffusing material suspended therein, the back projection screens of this invention are formed by embossing a Fresnel lens into one face of a transparent thermoplastic sheet and subsequently coating the front face of the screen with a 1–5 mil thick layer of bulk diffusing material by withdrawal of the sheet from a bath of the material at a uniform rate.

Figure 2:
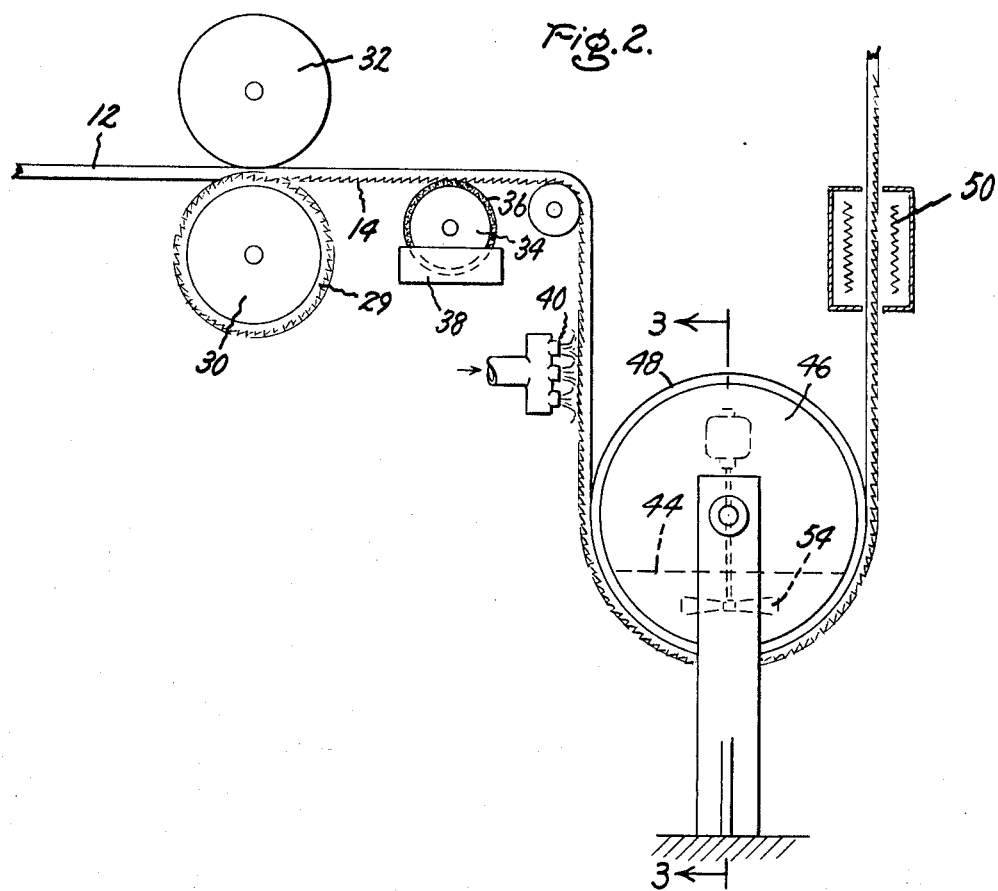
Figure 3:
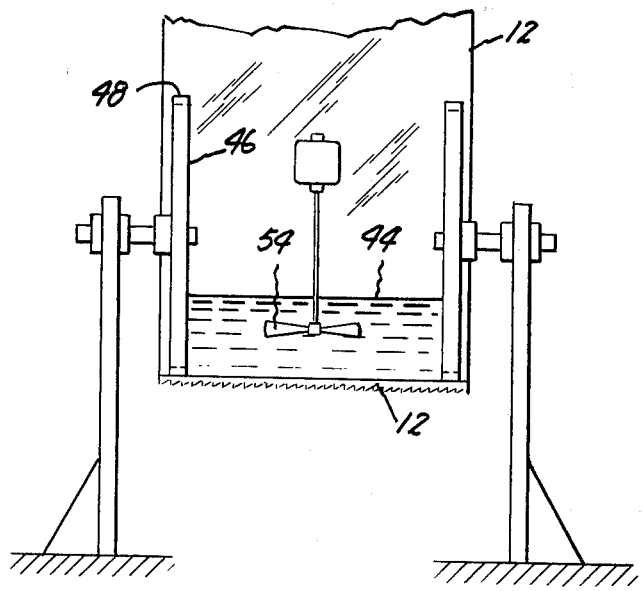
Figure 4:
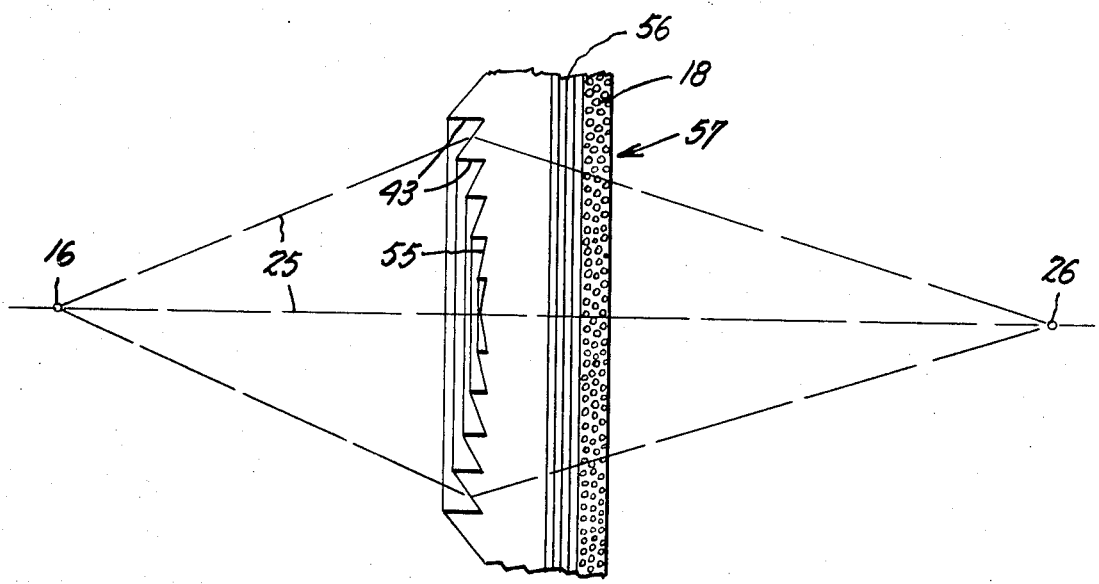
Figure 5:
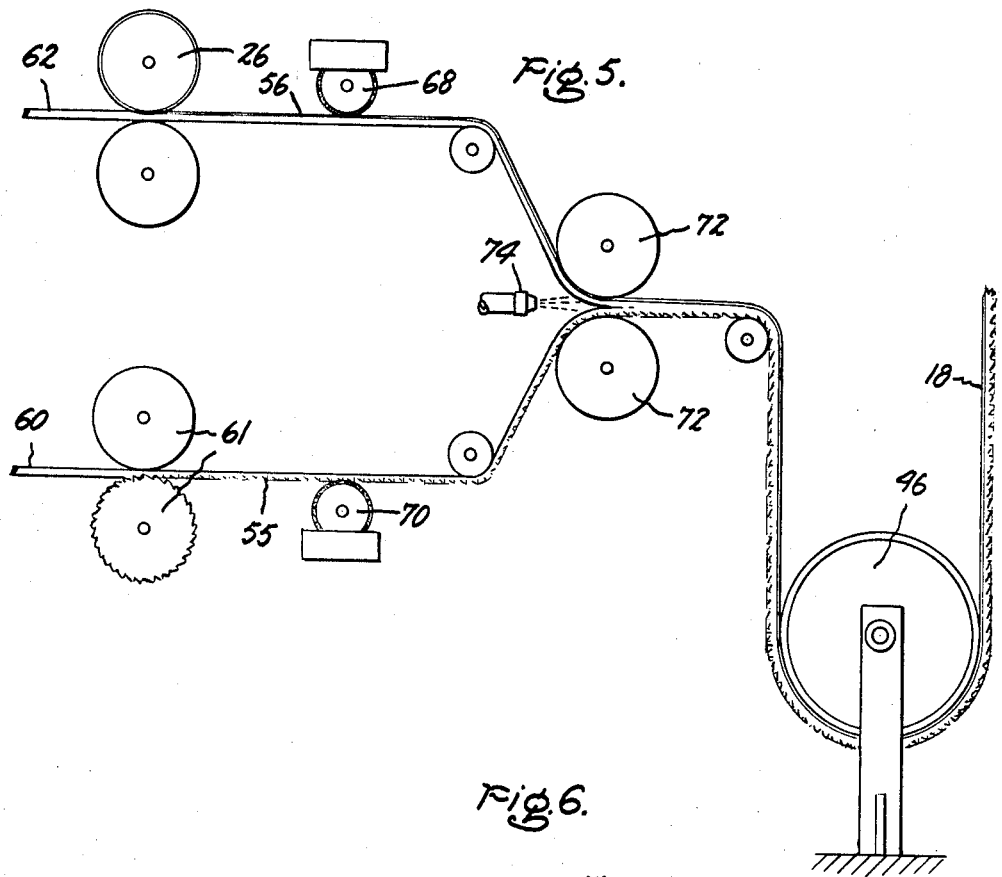
Figure 6:
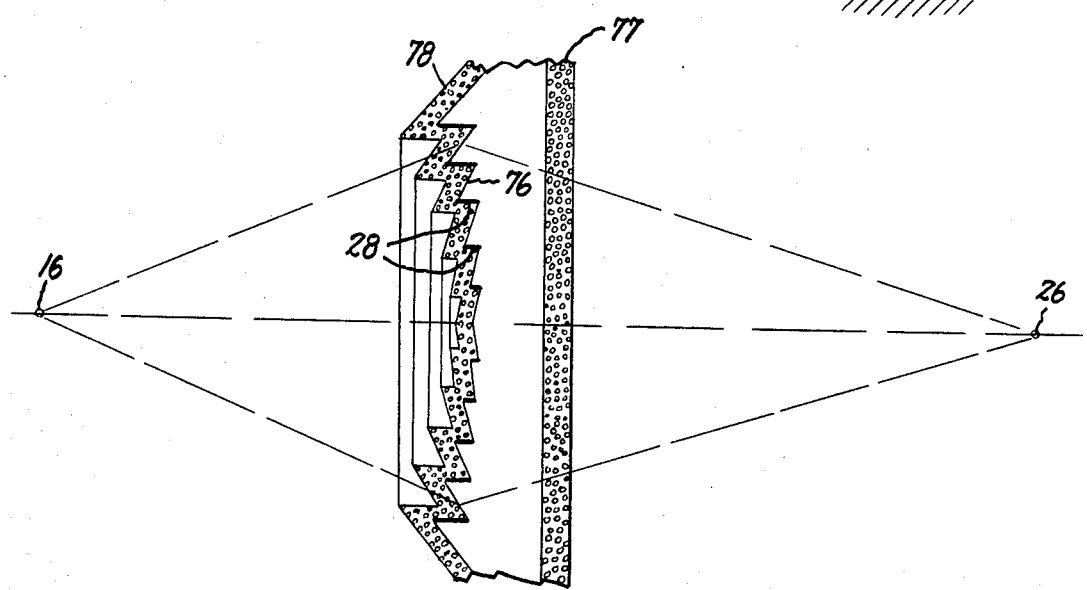
Figure 7:
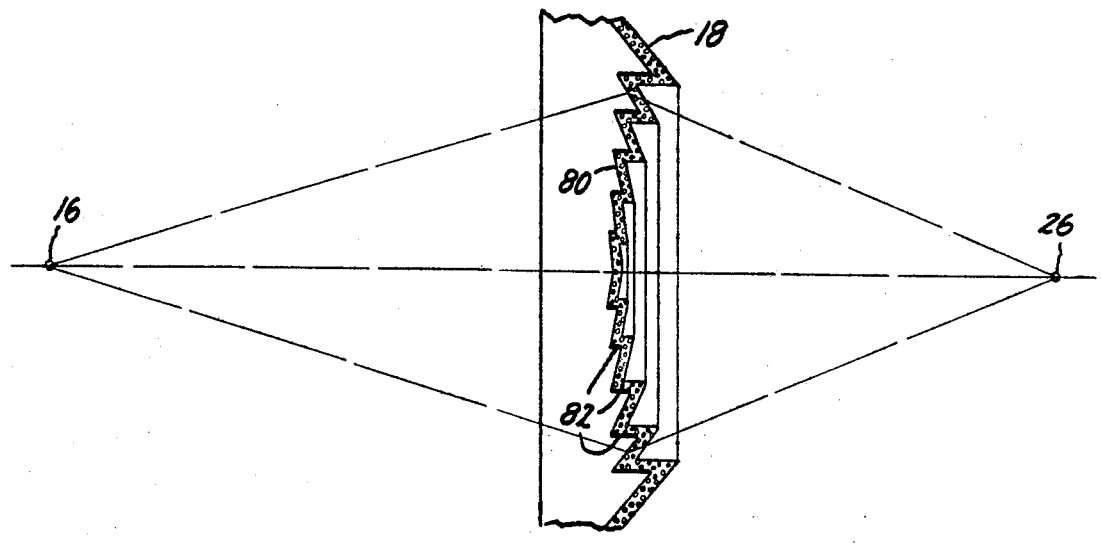
Figure 8:
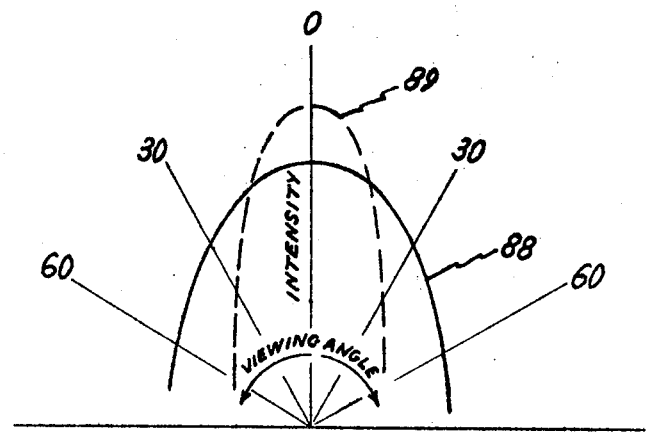

Further objects and advantages of the present invention will become apparent from the following detailed description of specific embodiments of the back projection screen of this invention illustrated in the accompanying drawing wherein:

FIG. 1 is a sectional view of a rear projectional screen formed in accordance with this invention, FIG. 2 is a flow diagram illustrating in sectional view a preferred method of forming the screen depicted in FIG. 1, FIG. 3 is a sectional view taken along lines 3—3 of FIG. 2, FIG. 4 is a sectional view of an alternate projection screen of this invention, FIG. 5 is a flow diagram illustrating in sectional form a preferred method of forming the projection screen of FIG. 4, FIG. 6 is a sectional view of another projection screen formed in accordance with this invention, FIG. 7 is a sectional view of still another projection screen formed in accordance with this invention, and FIG. 8 is a graphical illustration depicting light intensity distribution for a projection screen in accordance with this invention relative to projection screens utilizing ground glass as the diffusing surface.

A back projection screen 10 in accordance with this invention as illustrated in FIG. 1 and generally includes a thin plastic sheet 12 having a Fresnel lens 14 embossed within the back face of the screen (i.e., the face of the screen disposed adjacent projection source 16 illuminating the screen) and a layer 18 of bulk diffusion material coated upon the front face of the screen to produce a multiple scattering of light rays passing therethrough. Typically, layer 18 is between 1.0 and 5 mil thick and contains a multitude, e.g., 4 or more, of light diffusing particles 20 along the thickness of the layer to reduce the scintillation and enhance the viewing angle of the screen by diffusing each ray of light by a plurality of particles as the light rays pass through the layer.

Fresnel lens 14 includes a plurality of prismatic lenses 22 having a light transmission surface 24 disposed at an increasing angle relative to the plane of the projection screen with increased departure of the prismatic lenses from the center axis of the screen. Desirably, the light transmission surface of each prismatic lens is disposed at an angle to refract a center light ray 25 from projection source 16 passing through each light transmission surface to a single focal point, identified by reference numeral 26, situated at the anticipated normal viewing location of the screen. Thus, each prismatic lens of a back projection screen designed for viewing from afar would refract the center ray passing through each light transmission surface to a substantially perpendicular attitude relative to the plane of the screen while screens designed for normally close viewing would refract the center light rays more sharply toward the center of the projection screen.

Fresnel lens 14 is formed in a conventional manner utilizing a V-shaped diamond tool to cut grooves in a master, typically of engraver's brass, with the angular disposition of the V-shaped diamond tool relative to the plane of the master being gradually tipped toward the edge of the screen to provide the desired small angle of ascent between adjacent prismatic lenses by an increase in the penetration depth of the diamond tool into the master. Desirably, the Fresnel lens is cut in the master as a continuous spiral to reduce the cost of the engraving although the Fresnel lens also can be cut as concentric zones, if desired, to minimize distortion in the projected image. In accordance with this invention, the face of the V-shaped diamond tool cutting the surface for pressing the risers 28 of the Fresnel lens, i.e., that part of the Fresnel lens not utilized for the refraction of light, is roughened to produce a roughened riser surface in the pressed Fresnel lens while the surface of the tool cutting the surface for pressing the light transmission surfaces of the Fresnel lens is optically smooth to minimize surface defects tending to interfere with light transmission through the Fresnel lens. Typically, the Fresnel lens indentations are cut into the master to produce a light transmission surface of each prismatic lens extending to a length between approximately 5 and 20 mils with the focal length of the Fresnel lens being determined by the angle of ascent of the diamond tool during the cutting of the prismatic surfaces. In general, the diamond tool will penetrate the surface of the master to a depth of approximately 0.5 mil at the center of the master and is gradually tipped to penetrate to a depth of approximately 5 to 20 mils at the edges of the screen dependent upon such factors as the size and focal length of the screen. Techniques for engraving a Fresnel lens master utilizing a gradually tipped diamond tool also are described in an article (incorporated herein by reference) entitled, "Thin Sheet Plastic Fresnel Lenses of High Aperture," published in the Journal of the Optical Society of America, Vol. 41, No. 11, Nov., 1957, pages 807-815.

After engraving, the master, identified by reference numeral 29 in FIG. 2, is secured to the surface of cylinder 30 to press Fresnel lens 14 into thermoplastic sheet 12 utilizing a second cylinder 32 as a back roller for the embossing operation. The thermoplastic sheet typically is at least 10 mils thick to assure mechanical strength in the screen while being less than 40 mils thick to provide good resolution in the finished screen. In general, any clear thermoplastic material can be utilized for the screen with cellulose acetate, polystyrene, and methyl methacrylate being suitable for forming the screen. Rigid vinyl plastics or a polycarbonate resin, such as Lexan, however are preferred because of the mechanical strength characteristic of these plastics.

After embossing Fresnel lens 14 into plastic sheet 12, the plastic sheet is passed over a roller 34 having a liquid absorbent surface 36, e.g., of felt or a sponge material, for transferring black ink from bath 38 to the Fresnel embossed surface of the plastic sheet. Because the light transmission surface 24 of the Fresnel lens is highly smooth while the risers 28 of the Fresnel lens have been embossed with roughened surface, the ink tends to adhere to the roughened risers by capillary action while flowing from the relatively smooth light transmission surface of the Fresnel lens. Desirably, a stream of forced hot air is applied to the inked surface of the plastic sheet from a plurality of air jets 40 to dry inked layer 43 on the surface roughened risers while applying a slight mechanical force to the liquid tending to remove residual ink from the optically smooth light transmission surface of the Fresnel lens. When production of the screen on a continuous basis is not desired, other suitable techniques can be employed to form the screen, e.g., the Fresnel lens can be stamped into a heated plastic sheet of rectangular configuration and after the ink has been coated atop the embossed Fresnel lens, the sheet can be rotated to centrifugally remove the ink from the light transmission surface of screen.

Layer 18 of bulk diffusion material is applied to the surface of sheet 12 remote from the embossed Fresnel lens by passing the edges of the continuous sheet under a bath 44 contained by the sheet in association with a pair of circular metallic plates 46 having a rubber periphery 48. To assure a liquid seal between the plates and the sheet, bath 44 desirably is maintained at a shallow depth, e.g., less than 6 inches, and a maximum tension (determined primarily by the tensile strength of the thermoplastic material forming sheet 12) is applied to the sheet to maximize contact between the unembossed surface of the sheet and the rubber periphery of plates 46. By drawing the sheet from contact with the bath at a rate of approximately 0.5 to 4 inches per minute, a layer of bulk diffusion material having a uniform thickness between approximately 1 and 5 mils is coated atop the flat surface of the sheet.

Preferably bath 44 contains substantially equal amounts by weight of a resin and a light diffusing particle having an index of refraction differing from the index of refraction of the resin by an amount between 0.03 and 0.15. The resin employed in the bath typically is a water white resin commonly used in a paint industry with alkyd and acrylic resins being particularly suitable. The resin serves primarily to bind the very small light diffusing particles to the sheet and is dilute with sufficient solvent relative to the rate of constant withdrawal of sheet 12 from bath 44 to assure a 1 to 5 mil layer of bulk diffusing material on the projection screen.

Particles 20 of layer 18 should be of fine size, i.e., each particle desirably having a diameter less than 0.1 mil, and typically may be of rounded particle configuration (as contrasted with with flakes or needle shaped particles) with spherical particles preferably being utilized for the diffusing agent. Among the materials suitable for forming the light diffusing particles are silica, powdered glass, talc, cryolite and calcium fluoride. Because of the small size of the particles relative to the thickness of layer 18, a plurality of particles are present in the thickness of bulk diffusion material to effect a diffusion of light rays passing therethrough. Bath 44 also can contain carbon black to reduce the light transmission of the screen by an amount between 5 and 35 percent to enhance the ambient light rejection characteristics of the screen. In general, however, the blackened risers of the Fresnel lens should provide sufficient ambient light rejection for the screen that carbon black is not required in the bath.

After coating the surface of sheet 12 with layer 18 of bulk diffusing material, the sheet is passed through a heater 50 to dry the coated sheet prior to storage on a take-up reel (not shown). In those situations when agitation of bath 44 produced by the continuous traversal of sheet 12 along circular plates 46 is not sufficient to adequately suspend the light of diffusing particles therein to assure a uniform deposition atop the sheet, any conventional auxillary source of bath circulation such as impeller 54 extending into the bath may be employed or a defloculating agent may be added in the bath to assist in maintaining an adequate suspension therein. Both the preferred composition of layer 18 and the method of applying the layer are described and claimed in my copending U.S. Pat. application Ser. No. 769,820, filed Nov. 23, 1968, now abandoned, and assigned to the assignee of the present invention.

While the back projection screens of this invention preferably employ a bulk diffusing layer comprising a resin and light diffusing particles having an index of refraction differing from the resin by an amount between 0.03 and 0.15, any layer of bulk diffusing material producing a multiple scattering of light rays passing therethrough can be employed in the practice of this invention. Thus, layer 18 can be formed of a resin and diffusing particles having approximately equal indices of refraction, e.g., indices of refraction differing by amounts as small as 0.01, as well as a resin and diffusing particles having indices of refraction differing by as much as 0.3. The layer of bulk diffusion material, however, should be at least approximately 1.0 mil thick, and contain a plurality of light diffusing particles within the thickness of the layer. To assure this result, the light diffusing particles should have a diameter no greater than 25 percent of the total thickness of layer 18 with the diameter of the particles preferably having a diameter no greater than 15 percent of the total thickness of the layer. By assuring that light rays from projection source 16 are multiply diffused, i.e., diffused by two to more particles during transmission through the projection screen, scintillation in the screen is substantially reduced and uniform brightness over a large viewing angle is achieved. When both surfaces of screen 10 are coated with layer 18 of bulk diffusing material, the screen thickness desirably is maximized, i.e., up to 40 mils, consistent with an acceptable loss of resolution to further minimize scintillation in a given screen.

While the back projection of the screen of this invention has been described as a Fresnel lens having concentric prismatic surfaces at a gradually increasing angle relative to the plane of the screen to refract light passing therethrough to a desired viewing location, the screen also can be formed by disposing vertically and horizontally extending Fresnel lenses along opposite faces, respectively, of a unitary screen as shown in FIG. 4. Thus, Fresnel lens 55 extending horizontally across the back face of screen 57 serves to focus center rays 25 of light from projection source 16 passing through each prismatic lens of the Fresnel lens to a desired viewing point 26 in a vertical plane while Fresnel lens 56 extending vertically across the front face of the screen serves to refract center rays of light from the projection source to a focal point in a horizontal plane. Although the focal point of the vertically and horizontally extending Fresnel lenses normally are at an equal span from the projection screen, it often can be desirable to have the focal point of vertically extending Fresnel lens 56 at a different span from the screen than the focal point of horizontally extending Fresnel lens 55 to provide independent control of the vertical and horizontal viewing angles. As with the screen of FIG. 1, a layer 18 of bulk diffusion material is applied to the front face of the screen to multiply refract light rays passing therethrough and the risers of each Fresnel lens are blackened (as exemplified by inked layers 43) to increase the ambient rejection of the screen.

A preferred method of forming the projection screen of FIG. 4 in a continuous operation is illustrated in FIG. 5 and generally comprises passing of a first thermoplastic sheet 60 through a pair of embossing rollers 61 to press Fresnel lens 55 into one surface of the sheet while a second thermoplastic sheet 62 has Fresnel lens 56 embossed in the upper face thereof by an engraver's master carried on cylindrical roller 26. After blackening of the risers of the embossed Fresnel lenses with ink applied by means of roller pads 68 and 70, the embossed sheets are passed through rollers 72 in a back to back configuration and a suitable solvent, e.g., methylene chloride for Lexan sheets, is sprayed from spray nozzle 74 upon the smooth surface of the sheets at the nip between the sheets to permit the mild applied pressure from rollers 72 to seal sheets 60 and 62 to unitary screen 57. The outer edges of the thermoplastic sheet preferably are not embossed during the formation of the Fresnel lens and the smooth borders of the screen are passed under circular plates 46 at a continuous rate to apply layer 18 of bulk diffusing material atop the front surface of the screen utilizing techniques heretofore described with reference to FIG. 2 In general, plastic sheets approximately 15 mils thick are preferred for forming the composite screen of FIG. 3 with the Fresnel lens indentations extending to a maximum depth of approximately 10 mils at the edges of each sheet. Typically, the length of each light transmitting surface of the prismatic elements forming the Fresnel lens in the screen of FIG. 3 is between 5 to 20 mils and of optical smoothness (in contrast to the surface roughened risers of the Fresnel lens) to refract the center rays passing through each prismatic element to the desired viewing location without loss of resolution. If desired, however, same roughening can be present on the surface of the light transmission surface of the Fresnel lens to assist in diffusing the light passing through the screen provided such roughening does not produce an inordinate loss of resolution in the screen. When the light transmitting surfaces of the Fresnel lens are roughened, the risers typically are not blackened with ambient rejection in the screen being achieved by incorporating blackening only into layer 18 of bulk diffusing material.

An alternate projection screen of this invention is shown in FIG. 6 wherein a spherical Fresnel lens 76 is embossed along the rear face of the screen to focus light from projection source 16 upon a normal viewing location 26 while layers 77 and 78 of bulk diffusion material are coated atop the smooth front and embossed back face of the screen, respectively, to multiply diffuse light passing through the screen. Simultaneous coating of both faces of the screen can be achieved utilizing the method described in my heretofore cited U.S. Pat. application Ser. No. 769,820 and the thickness of the layers are regulated by the viscosity of the bath and rate of withdrawal of the sheet therefrom to produce a total thickness in the bulk diffusion layers between 1 and 5 mils. In the screen depicted in FIG. 6, only the risers 28 of the Fresnel are blackened for ambient rejection to maximize the brightness obtainable from the screen.

If desired, the layer of bulk diffusion material for multiply refracting light passing therethrough can be applied over only the embossed front face of the screen. Such screen is shown in FIG. 7 wherein Fresnel lens 80 is embossed as concentric zones of stepped prismatic elements along the front face of the screen and a layer 18 of bulk diffusing material is coated thereon. For ambient rejection, the roughened risers of the prismatic elements forming the Fresnel lens are blackened with carbon black 82. Light from projection source 16 impinging on the flat new face of the screen passes through the screen to Fresnel lens 80 where the projected light is focused to the desired viewing location 26 determined by the angle of ascent of adjacent prismatic elements of the Fresnel lens while the light rays are multiply scattered within the confines of bulk diffusion layer 18 to increase the viewing angle of the screen and reduce the scintillation observable to the viewer.

The advantageous qualities of the screens of this invention are illustrated by the graphs of FIG. 8 wherein the intensity distribution, identified by reference numeral 88, of the projection screen of FIG. 1 is plotted against the intensity distribution 89 of an identical projection screen having a frosted glass diffusing surface. As can be seen from the graph, the projection screen having a frosted glass diffusing surface exhibits a high intensity at the focal point of the screen (identified by a viewing angle of 0°) with the illumination intensity of the screen diminishing rapidly as the viewing angle approaches 30° while the projection screen of FIG. 1 is characterized by a lower illumination intensity at the focal point of the screen and a relatively less diminished intensity at increased viewing angles.

Intensity measurements at various viewing angles and distances both from the screen of FIG. 1 and from an identical screen having a frosted glass surface (rather than a layer containing a plurality of diffusing particles) discloses the frosted glass screen to have an intensity in excess of 10 foot-lamberts at the focal point of the screen with the intensity dropping to less than 5 foot-lamberts at the right and left edges of the screen respectively, while the projection screen of FIG. 1 exhibits a substantially uniform intensity of approximately 2 foot-lamberts over the entire width of the screen when both screens are viewed from the screen focal points. When both screens were viewed at an angle of 45° relative to the plane of the screen at a span equal to one-half the focal distance of the Fresnel lens, the frosted glass screen exhibited an intensity varying between 0.15 and 0.3 foot-lamberts (a diminution in intensity in excess of 10 fold relative to the screen intensity when viewed from the screen focal point) while the screen of FIG. 1 exhibited a substantially uniform intensity of 0.5 foot-lamberts over the entire width of the screen, i.e., an approximately 4 fold decrease in intensity. Similarly, the projection screen of FIG. 1 exhibited a substantially uniform intensity between 1.0 and 1.4 foot-lamberts across the width of the screen when viewed at a 28° angle relative to the plane of the projection screen over a distance equal to 1.5 fold the focal length of the screen while the frosted glass screen viewed from the same vantage point had an intensity distribution which varied from 0.05 to 0.5 foot-lamberts.

The advantages of the screen of this invention are further exhibited by the following table comparing the projection screen of FIG. 1 having a layer of bulk diffusing material containing amorphic particles of random size characterized by an index of refraction differing from the index of refraction of the resin binder by an amount between 0.03 and 0.15 (specimen I), an identical screen having frosted glass as the light diffusing agent (specimen II) and an identical screen having a layer of bulk diffusing material containing spherical particles of uniform dimension (specimen III).

TABLE

| Span from screen | Angle relative to plane of screen, degree | Intensity (foot-lamberts) | | | | | | | | |
|---|---|---|---|---|---|---|---|---|---|---|
| | | Specimen I, screen area viewed | | | Specimen II, screen area viewed | | | Specimen III, screen area viewed | | |
| | | Right | Center | Left | Right | Center | Left | Right | Center | Left |
| Fresnel focal point | 0 | 2 | 2 | 2 | 4 | 10 | 4 | 5 | 5.1 | 5 |
| 0.5 Fresnel focal point | 45 | .5 | .5 | .49 | .15 | .3 | .15 | .24 | .24 | .25 |
| 1.5 Fresnel focal point | 28 | 1.0 | 1.2 | 1.4 | .05 | .3 | .5 | .04 | 1.5 | 2.0 |
| Fresnel focal point | 35 | 1.0 | 1.0 | 0.8 | .2 | .1 | .1 | .7 | .5 | .4 |

What I claim is new and desire to secure by Letters Patent of the United States is:

1. A back projection screen for viewing on the front face of the screen an image projected upon the back face of the screen comprising a sheet of transparent plastic having a Fresnel lens embossed along one face of said screen for focusing light rays passing therethrough and an approximately 1.0 – 5.0 mil thick layer of a bulk diffusing material, containing sufficient blackening to reduce the transmission of the screen by an amount between 5 and 35 percent, coated atop said front face of said screen to produce multiple scattering of projected light rays therein during passage of said light rays through said layer.

2. A back projection screen according to claim 1 wherein said Fresnel lens is embossed along the back face of said screen and further including blackening on the risers of the Fresnel lens.

3. A back projection screen according to claim 1 wherein said diffusing layer comprises a resin and light diffusing particles in substantially equal amounts by weight, said resin having an index of refraction differing from the index of refraction of said light diffusing particles by an amount between 0.03 and 0.15.

4. A back projection screen according to claim 1 wherein said Fresnel lens is a spiral prism having a light transmitting face exhibiting a gradually increasing angle relative to the plane of the screen with increased departure of the prism from the center of the screen.

5. A back projection screen according to claim 1 wherein said Fresnel lens is a plurality of concentric prismatic surfaces, said surfaces exhibiting a gradually increasing angle relative to the plane of the screen with increased departure of the prismatic surfaces from the center of the screen.

6. A back projection screen according to claim 1 wherein said Fresnel lens comprises a plurality of prismatic sections extending longitudinally across one face of said thermoplastic sheet and latitudinally across the opposite face of said sheet, the angular disposition of the light transmitting surface of each prismatic section increasing relative to the plane of the screen with increase departure of the prismatic elements from the screen center.

7. A method of forming a back projection screen comprising the steps of:
   embossing a face of a transparent thermoplastic sheet into a Fresnel lens having a desired focal point with a master producing a Fresnel lens having optically smooth light transmitting surfaces with surface roughened risers,
   coating said selectively roughened Fresnel lens with a fluid blackening agent; and
   coating the face of said sheet facing said focal point with an approximately 1.0 – 5.0 mil thick layer of a bulk diffusing material by immersing the face of said sheet in a bath of said diffusing material and withdrawing said sheet from the bath at a controlled rate to provide a substantially uniform layer of said bulk diffusing material along said face.

8. A method of forming a back projection screen according to claim 7 wherein said Fresnel lens is embossed in a longitudinal direction across said thermoplastic sheet, and further including juxtaposing said embossed sheet in a back to back configuration with a second thermoplastic sheet having an embossed Fresnel lens extending in a direction perpendicular to the Fresnel lens disposition of said first sheet and flowing a solvent for said thermoplastic sheets at the nip of the flat confronting faces of said sheets to bond said sheets into a unitary screen.

* * * * *